(12) United States Patent
Noon et al.

(10) Patent No.: US 8,963,732 B2
(45) Date of Patent: Feb. 24, 2015

(54) SLOPE STABILITY ALARM

(75) Inventors: David Noon, Pullenvale (AU); Lachlan Campbell, New Farm (AU)

(73) Assignee: Groundprobe Pty Ltd, Windsor, Queensland (AU)

(*) Notice: Subject to any disclaimer, the term of this patent is extended or adjusted under 35 U.S.C. 154(b) by 38 days.

(21) Appl. No.: 13/981,761

(22) PCT Filed: Jan. 20, 2012

(86) PCT No.: PCT/AU2012/000047
§ 371 (c)(1),
(2), (4) Date: Aug. 2, 2013

(87) PCT Pub. No.: WO2012/100288
PCT Pub. Date: Aug. 2, 2012

(65) Prior Publication Data
US 2013/0307695 A1 Nov. 21, 2013

(30) Foreign Application Priority Data

Jan. 28, 2011 (AU) .................. 2011900272

(51) Int. Cl.
G08B 21/00 (2006.01)
G08B 21/18 (2006.01)
G01S 5/00 (2006.01)

(52) U.S. Cl.
CPC ............... G08B 21/18 (2013.01); G01S 5/0027 (2013.01)
USPC ........ 340/686.1; 340/540; 340/689; 340/690; 702/2

(58) Field of Classification Search
CPC ............................ G08B 21/18; G01S 5/0027
USPC ................. 340/539.26, 540, 669, 500, 686.1, 340/686.6, 689, 690; 73/784; 702/2, 189
See application file for complete search history.

(56) References Cited

U.S. PATENT DOCUMENTS

| 4,284,987 A | * | 8/1981 | Gibson et al. ................. 340/689 |
| 5,216,922 A | * | 6/1993 | Gustafson et al. ............. 73/784 |
| 6,850,183 B2 | * | 2/2005 | Reeves et al. .................. 342/22 |
| 7,123,353 B2 | * | 10/2006 | Hsieh ........................... 356/138 |

* cited by examiner

*Primary Examiner* — Anh V La
(74) *Attorney, Agent, or Firm* — Howard & Howard Attorneys PLLC

(57) ABSTRACT

A method of generating an alarm indicating movement of a slope under inspection that sets an alarm if (1), where $d_X$ is a first measured displacement, $d_Y$ is another measured displacement at a chosen difference from $d_X$, and $d_Z$ is another measured displacement at a chosen difference from $d_Y$, and the corresponding times at which the chosen distances are measured are $t_A$, $t_B$ and $t_C$ respectively for $d_X$, $d_Y$ and $d_Z$. So that an alarm is set if the ratio of the time taken for the slope to move between $d_Y$ and $d_Z$ compared to moving between $d_X$ and $d_Y$ is less than the ratio of the respective displacements.

$$\frac{t_C - t_B}{t_B - t_A} < \frac{d_Z - d_Y}{d_Y - d_X} \qquad (I)$$

15 Claims, 5 Drawing Sheets

SLOPE STABILITY ALARM

CROSS REFERENCE TO RELATED APPLICATION

This application is a national stage application of PCT/AU2012/000047, filed Jan. 20, 2012, which claims priority to Australian Patent Application No. 2011900272, filed Jan. 28, 2011, the disclosures of which are hereby incorporated by reference in their entirety.

FIELD OF THE INVENTION

The invention relates to a method and system of determining alarm conditions. In particular, although not exclusively, the invention relates to a method and system of determining alarm conditions in the field of slope stability monitoring.

BACKGROUND TO THE INVENTION

Slope stability is a critical safety and production issue for open cut mines, quarries, civil engineering works and the like. Major wall failures can occur seemingly without warning causing loss of lives, damage to equipment and significant disruption to the mining process resulting in significant losses in productivity.

Tell-tale signs of slope instability include the opening of cracks on the wall surface and crest, audible creaking, and increased rilling of spoil. It is difficult to interpret these signs to be able to distinguish between expected settling of recently excavated ground and events that will lead to catastrophic slope failure.

There are various slope monitoring systems employed by mine sites to monitor movement of slopes in order to provide an accurate reflection of the movement characteristics of the monitored slope. Such systems include the use of extensometers and laser electronic distance measurement to measure the dilation of cracks appearing on the crest or face of the slope. Geotechnical specialists can then interpret the pattern and history of movement to improve prediction of the failure process and to advise appropriate and timely stabilisation or safety management actions.

Almost all slopes exhibit a range of movement types prior to failure. These movement types include (T. D. Sullivan, "Understanding pit slope movements", Geotechnical Instrumentation and Monitoring in Open Pit and Underground Mining p 435-445, 1993):
1) regressive movements leading to stability,
2) progressive movements leading to collapse,
3) transitional movements which combine the regressive movements followed by progressive, and
4) stick slip which is a number of regressive/transgressive movements normally induced by an external influence such as rainfall, blasting or mining.

The Applicants have previously provided a novel slope monitoring system published under International Publication number WO 2002/046790. They have also described a Method and System of Determining Alarm Conditions that is particularly useful for their slope monitoring system in WIPO publication WO 2007/012112. The content of these two specifications are incorporated herein by reference.

More recently they have developed a Work Area Monitor described in International patent application number PCT/AU2011/001042. The Work Area Monitor device also uses slope stability radar to monitor the stability of a slope in a mine work area. Although existing alarm determination methods can be applicable to the Work Area Monitor the inventor has determined that other alarm methodologies can be suitable.

All absolute movement measures (displacement, velocity, acceleration and other time-derivatives) of a wall depend on many factors including the displacement type, the size of the moving area, the material type, the planes of weakness in the wall, complexity of the sliding plains, the temporal history of movements, and external influences on the system. Even the look angle of the monitoring apparatus influences the apparent current velocity of the movement. For example, if the look angle is 60 degrees from the wall movement velocity vector, the measured velocity will be half the actual velocity of the wall. In short, simply using an absolute movement measure to trigger alarms gives limited indication of the risk of failure associated with the slope under consideration.

Thus, whilst prior art slope monitoring apparatuses offer varying levels of monitoring accuracy, it is desirable to provide a slope monitoring apparatus that can automatically and accurately determine alarm conditions based on the recorded displacement data of the slope under inspection, thus providing a warning of a change in risk associated with the stability of a slope.

The reference to any prior art in this specification is not, and should not be taken as, an acknowledgement or any form of suggestion that the prior art forms part of the common general knowledge in Australia.

OBJECT OF THE INVENTION

It is an object of the invention to overcome or at least alleviate one or more of the above problems and/or provide the consumer with a useful or commercial choice.

Further objects will be evident from the following description.

DISCLOSURE OF THE INVENTION

In one form, although it need not be the only or indeed the broadest form, the invention resides in a method of generating an alarm indicating movement of a slope under inspection, said method including the steps of:
(i) setting at least three stability set points including a first set point, a second set point and a third set point;
(ii) determining a first change between the first set point and the second set point;
(iii) determining a second change between the second set point and the third set point;
(iv) determining a change ratio of the second change over the first change;
(v) determining a first time taken for a slope to exhibit change between the first set point and the second set point;
(vi) determining a second time taken for a slope to exhibit change between the second set point and the third set point;
(vii) determining a time ratio of the second time over the first time; and
(viii) setting an alarm if the time ratio is less than the change ratio.

Suitably the stability set points are position or position related set points. The position related set points may be derivative values including velocity or acceleration. The change is therefore a measured value of displacement of a slope, or a velocity of a slope, or an acceleration of a slope.

Suitably the changes are absolute changes between the set points.

Preferably the set points are chosen so that the first change and second change are the same.

In a further form the invention resides in a slope monitoring system of the type that measures displacement of a slope; the slope monitoring system comprising an alarm determination module programmed to perform the steps of:

(i) setting at least three stability set points including a first set point, a second set point and a third set point;
(ii) determining a first change between the first set point and the second set point;
(iii) determining a second change between the second set point and the third set point;
(iv) determining a change ratio of the second change over the first change;
(v) determining a first time taken for a slope to exhibit change between the first set point and the second set point;
(vi) determining a second time taken for a slope to exhibit change between the second set point and the third set point;
(vii) determining a time ratio of the second time over the first time; and
(viii) setting an alarm if the time ratio is less than the change ratio.

Further features of the present invention will become apparent from the following detailed description.

BRIEF DESCRIPTION OF THE DRAWINGS

To assist in understanding the invention and to enable a person skilled in the art to put the invention into practical effect preferred embodiments of the invention will be described by way of example only with reference to the accompanying drawings, wherein.

DETAILED DESCRIPTION OF THE INVENTION

Figure 1:
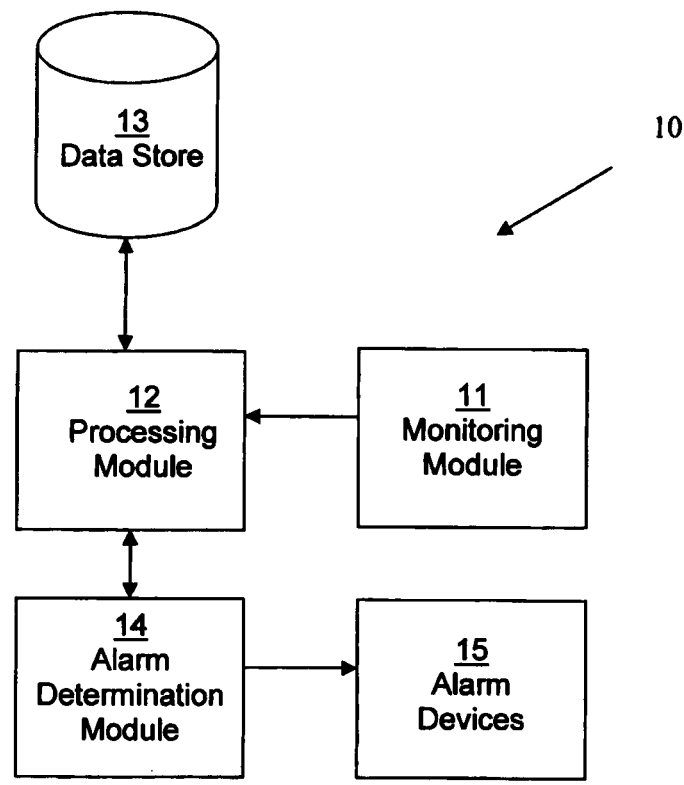
FIG. 1 shows a block schematic of a slope monitoring system according to an embodiment of the present invention.

Embodiments of the present invention reside primarily in the system and method of generating an alarm based on the ratio of time taken for a slope to exhibit a first displacement compared to the time taken to exhibit a second displacement. The alarm is generated independent of viewing angle to the wall, and is also independent of the direction of the wall movement.

In the following description the method steps have been illustrated in concise schematic form in the drawings, showing only those specific details that are necessary for understanding the embodiments of the present invention, but so as not to obscure the disclosure with excessive detail that will be readily apparent to those of ordinary skill in the art having the benefit of the present description.

In this specification, adjectives such as first and second, left and right, and the like may be used solely to distinguish one element or action from another element or action without necessarily requiring or implying any actual such relationship or order. Words such as "comprises" or "includes" are intended to define a non-exclusive inclusion, such that a process, method, article, or apparatus that comprises a list of elements does not include only those elements but may include other elements not expressly listed, including elements that are inherent to such a process, method, article, or apparatus.

FIG. 1 shows a block schematic of a slope monitoring system 10 according to an embodiment of the present invention. Slope monitoring system 10 comprises a monitoring module 11 in communication with a processing module 12 and a data store 13 in communication with processing module 12. Slope monitoring system 10 further comprises an alarm determination module 14 in communication with processing module 12 and one or more alarm devices 15 in communication with alarm determination module 14.

Monitoring module 11 is in the form of any known slope monitoring apparatus able to detect movement in a wall of a slope. Preferably, monitoring module 11 is in the form of a radar module in conjunction with a video module in order to detect movement of a slope wall under inspection. Suitable devices are described in the patent applications mentioned above. Optionally, monitoring module 11 may be in the form of a plurality of extensometers, laser electronic distance measurement apparatus or the like.

Processing module 12 is in communication with monitoring module 11 and receives raw slope position data detected by monitoring module 11. Processing module 12 interprets the raw data received by monitoring module 11 and translates this raw data to displacement data for the slope under inspection. The processing module may also generate derivative values such as velocity and acceleration. Processing module 12 may be in the form of hardware, firmware or software operating on hardware in order to perform the function discussed briefly above.

Data store 13 is in the form of a database as is known in the art and is able to have data logically stored thereto and retrieved therefrom. Preferably, database 13 is implemented via software executing on appropriate hardware.

Alarm determination module 14 is in communication with processing module 12 and is preferably in the form of a software module executing on appropriate hardware. Additionally, alarm determination module 14 is in operative communication with data store 13 and utilizes the method of the present invention in order to determine whether alarm conditions exist in relation to the stability of the slope under inspection as will be discussed in greater detail below.

It will be readily apparent to a skilled person that processing module 12, data store 13 and alarm determination module 14 are suitably implemented on a computing device. The inventor has found that a mobile computing device, such as a laptop computer, is a suitable computing device. Optionally, each of processing module 12, data store 13 and alarm determination module 14 may be located on geographically separate computing devices with communication between each module facilitated by means of known distributed computing paradigms. Furthermore, it will be appreciated that processing module 12 and alarm determination module 14 may form part of single software platform with the modules being logical separations of the functional attributes of the same program.

The method of generating an alarm according to the present invention involves analysis of time required for the slope to exhibit known displacements or other position related values, such as velocity and acceleration. For ease of explanation the invention will be described by reference to displacement, but persons skilled in the art will readily apply the principles to velocity and acceleration.

Figure 2:
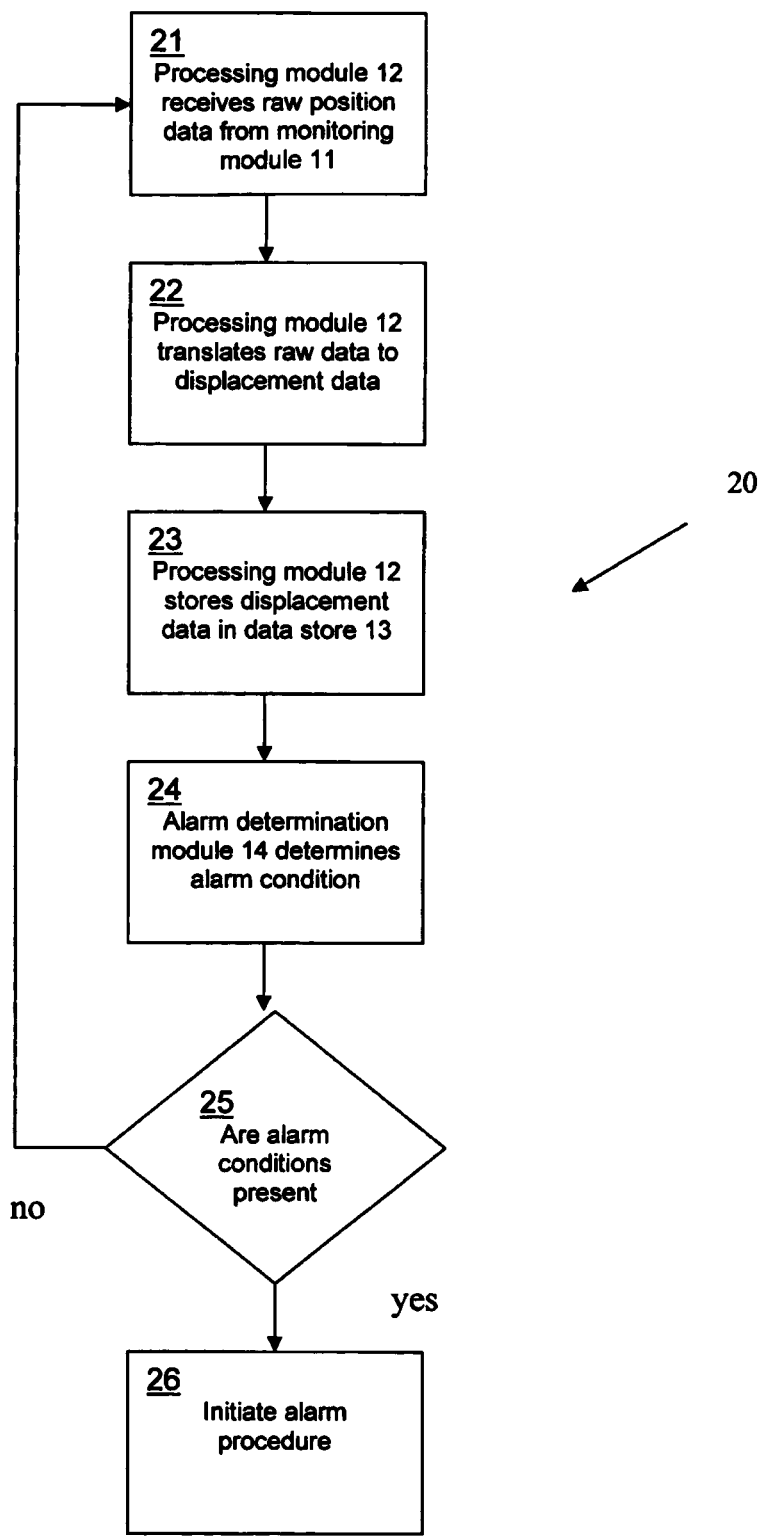
FIG. 2 shows a slope monitoring method according to an aspect of the present invention.

FIG. 2 shows a method 20 of slope monitoring according to an aspect of the present invention. The method commences with the processing module 12 receiving raw position data from monitoring module 11 in relation to the slope under inspection (step 21). Processing module 12 translates this raw position data to displacement data in respect of the slope under inspection (step 22) and stores this information in data store 13 (step 23).

Alarm determination module 14 then communicates with data store 13 in order to determine whether, based on the displacement data stored in data store 13 by processing module 12, alarm conditions exist (step 24). Step 24 will be discussed in greater detail below. If alarm conditions exist (step 25) then alarm determination module 14 initiates alarm procedure (step 26). Preferably, step 26 involves actuating a combination of one or more alarm mechanisms in alarm apparatus 15.

For example, alarm apparatus 15 may initiate a combination of aural, visual or tactile alarm signals in order to alert personnel of a slope instability event. Optionally, alarm apparatus 15 includes a communication module able to transmit an alert message to one or more relevant entities in order to alert these entities of the slope instability event.

If alarm conditions do not exist (step 25), then processing module again receives raw observation data from monitoring module 11 (step 21).

It will be appreciated that steps 21-23 may run in parallel with step 26 when alarm conditions are identified in step 24. As such, the slope monitoring system 10 of the present invention continues to monitor the slope under inspection during a possible slope failure event.

Figure 3A:
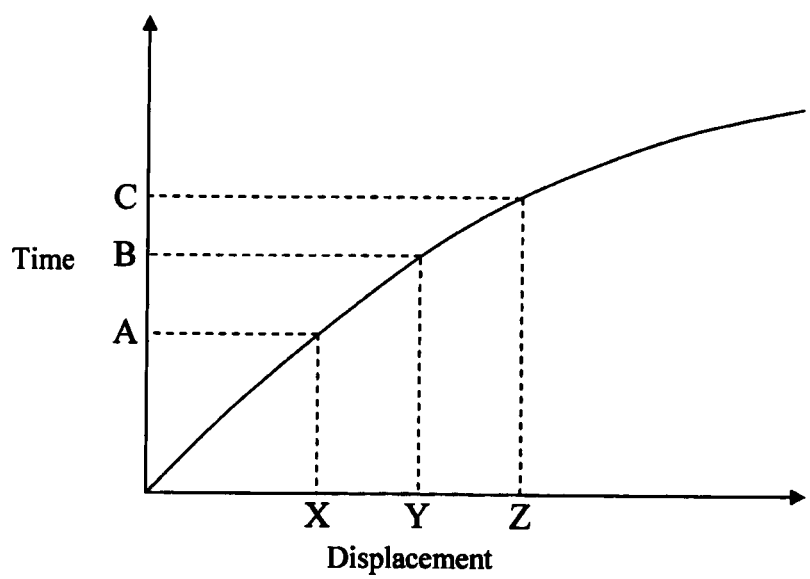
FIGS. 3a and 3b exemplify a method of determining alarm conditions forming part of the method shown in FIG. 2.

The method of determining alarm conditions shown in step 24 of FIG. 2 is exemplified by reference to FIG. 3. An alarm is set if the time taken for the slope to move a known distance gets shorter. This is best explained by the equation:

$$\frac{t_C - t_B}{t_B - t_A} < \frac{d_Z - d_Y}{d_Y - d_X}$$

where $d_X$ is a displacement measured by the system, $d_Y$ is another displacement measured by the system at a chosen difference from $d_X$, and $d_Z$ is another displacement measured by the system at a chosen difference from $d_Y$. The corresponding times at which the system measures the chosen displacements are $t_A$, $t_B$ and $t_C$ respectively for $d_X$, $d_Y$ and $d_Z$. So that an alarm is set if the ratio of the time taken for the slope to move between $d_Y$ and $d_Z$ compared to moving between $d_X$ and $d_Y$ is less than the ratio of the respective displacements.

As mentioned above, the set points may be other position related values such as velocity and acceleration. The respective equations in these cases are:

$$\frac{t_C - t_B}{t_B - t_A} < \frac{v_Z - v_Y}{v_Y - v_X}$$

where $v_X$, $v_Y$ and $v_Z$ are velocity set points rather than displacement set points; and $$\frac{t_C - t_B}{t_B - t_A} < \frac{a_Z - a_Y}{a_Y - a_X}$$

where $a_X$, $a_Y$ and $a_Z$ are acceleration set points.

It is convenient to choose the set points at an equal spacing. For instance, the set points may be chosen for displacement of 2 mm. The system will normally be observing the slope for an extended period of time with little or no movement. When movement is first detected an initial movement alarm may be generated (a yellow alert, which is the first set point). This initial displacement threshold may be an amount which is low enough for safety but high enough to avoid false alarms. It has been found that 2 mm is an appropriate threshold. This is represented by point X in FIG. 3a and occurs at time A. After the threshold is met the system will record the time B at which the next set point Y is reached. This may be set for a further displacement of, say, 4 mm (an orange alert). As the slope continues to move the system records the time C at which set point Z is reached (a red alert). If the displacement from Y to Z is the same as the displacement from X to Y the displacement ratio will be one. Thus the alarm will be set if the slope moves from Y to Z faster than it moved from X to Y (a flashing red alarm).

Figure 3B:
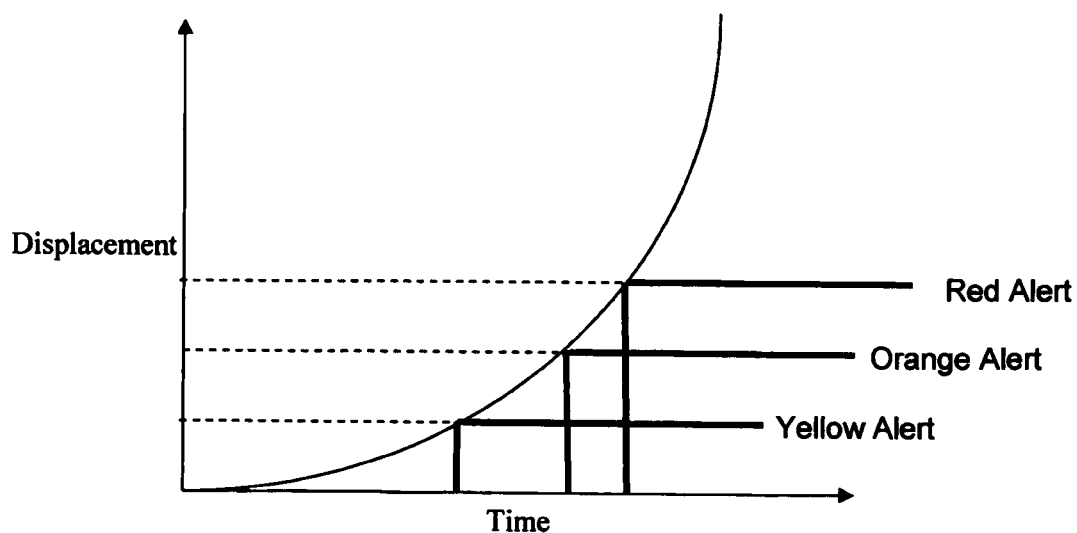
Figure 4:
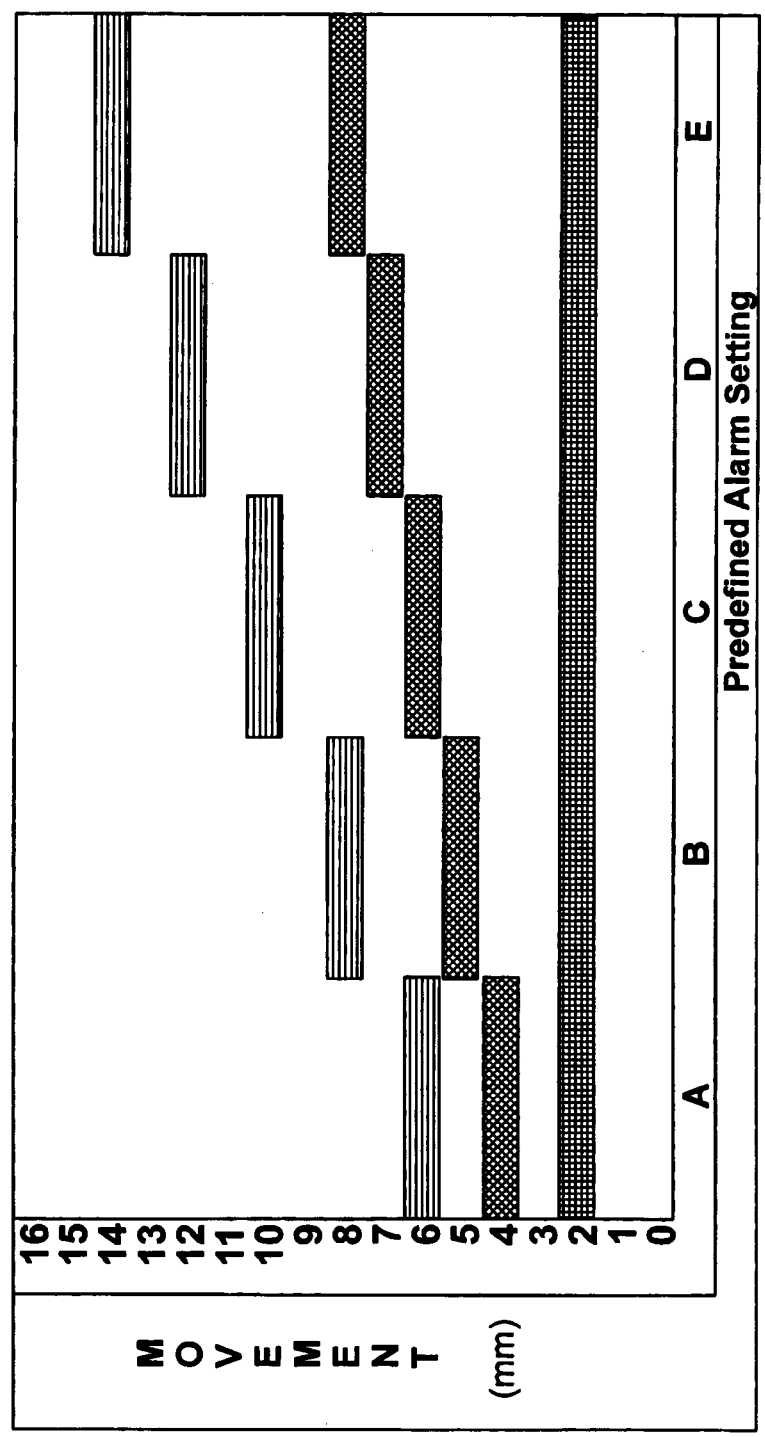
FIG. 4 shows a selection of predefine alarm conditions.

Persons skilled in the field will be more familiar with viewing the slope movement graph with time along the horizontal axis and displacement on the vertical axis. This conventional arrangement is shown in FIG. 3b with the yellow, orange and red alerts. A flashing red alarm occurs if the slope moves from Y to Z faster than it moved from X to Y Various set point configurations can be predefined. Some examples are given in FIG. 4. Predefined alarm setting A has a yellow alert threshold of 2 mm and spacing of 2 mm for the set points between the yellow and orange thresholds, and between then orange and red alert thresholds. Predefined alarm setting B has a yellow alert threshold of 2 mm and spacing of 3 mm for the set points between the yellow and orange alert thresholds, and between the orange and red alert thresholds. The other examples of FIG. 4 have pre-defined alert thresholds with spacings of 4 mm, 5 mm and 6 mm but any suitable set point spacing can be selected. It is also evident that the set point spacing need not be the same. Thus the distance from X to Y may be 4 mm and the distance from Y to Z may be 2 mm. In this case the distance ratio will be 0.5 and the alarm will trigger if the time difference between B and C is less than half the time difference from A to B.

Figure 5:
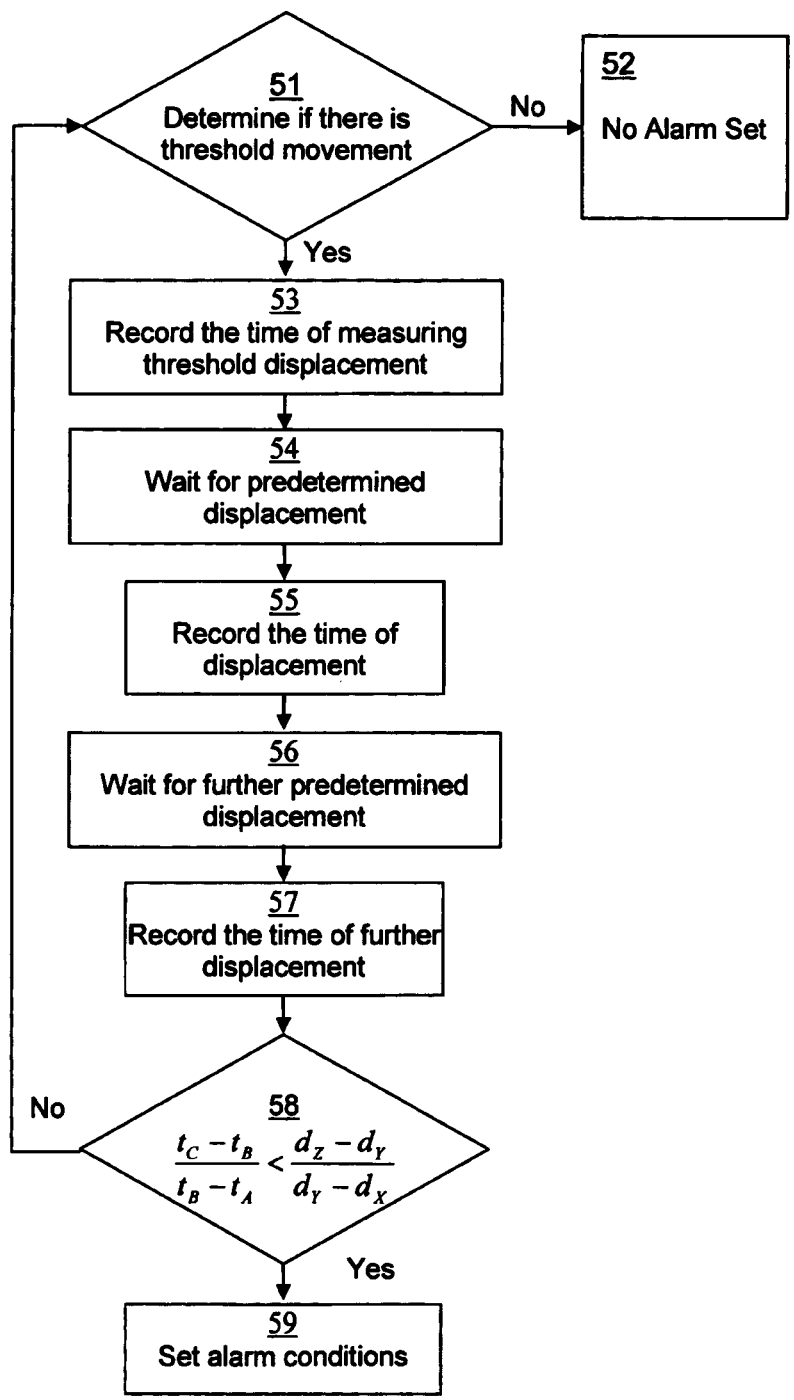
FIG. 5 shows a flow chart of the steps of the alarm generation process.

The flowchart of FIG. 5 outlines the sub-steps of step 24 in FIG. 2. The process of generating alarms only occurs once a predefined minimum displacement is detected. For the preferred embodiment the displacement is 2 mm but the invention is not limited to this distance. If displacement does not exceed the threshold there is no alarm set. When threshold movement is detected an initial (yellow) alert may be activated and the time of occurrence of the threshold movement is recorded (step 53) and stored in data store 13. The system monitors the slope until a predefined displacement occurs (step 54) (which may be 2, 3, 4 or more millimeters and which may activate an orange alert) and the time of occurrence of the displacement is recorded (step 55) and stored in data store 13. The system continues to monitor the slope until a further predefined displacement occurs (step 56) (which may conveniently be the same as the first displacement and which may active a red alert) and the time of occurrence of the further displacement is recorded (step 57) and stored in data store 13. The recorded times are recalled from the data store together with the predefined displacements to calculate the alarm equation (step 58). If the alarm equation is satisfied the alarm conditions are activated. The alarm conditions may be aural, visual and tactile, as is known in the field.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this invention is intended to embrace all alternatives, modifications and variations of the present invention that have been discussed herein, and other embodiments that fall within the spirit and scope of the above described invention.

The invention claimed is:

1. A method of generating an alarm indicating movement of a slope under inspection, said method including the steps of:
   (i) setting at least three stability set points including a first set point, a second set point and a third set point;
   (ii) determining a first change between the first set point and the second set point;
   (iii) determining a second change between the second set point and the third set point;
   (iv) determining a change ratio of the second change over the first change;
   (v) determining a first time taken for a slope to exhibit change between the first set point and the second set point;
   (vi) determining a second time taken for a slope to exhibit change between the second set point and the third set point;
   (vii) determining a time ratio of the second time over the first time; and (viii) setting an alarm if the time ratio is less than the change ratio.

2. The method of claim 1 wherein the stability set points are position or position related set points.

3. The method of claim 1 wherein the stability set points are derivative values including velocity or acceleration.

4. The method of claim 1 wherein the first change and the second change are measured values of displacement of the slope, or a velocity of the slope, or an acceleration of the slope.

5. The method of claim 1 wherein the first change and the second change are absolute changes between the set points.

6. The method of claim 1 wherein the set points are chosen so that the first change and second change are the same.

7. The method of claim 1 wherein the stability set points have equal spacing.

8. The method of claim 7 wherein the equal spacing is 2 millimeters.

9. The method of claim 1 including the further step of setting an initial movement alarm if the first set point is exceeded.

10. The method of claim 9 wherein the first set point is 2 mm or 3 mm or 4 mm or 5 mm or 6 mm.

11. The method of claim 1 including the further step of setting a further movement alarm if the first change or the second change exceeds a threshold.

12. The method of claim 11 wherein the threshold is chosen from 2 mm or 3 mm or 4 mm or 5 mm or 6 mm.

13. A slope monitoring system of the type that measures displacement of a slope; the slope monitoring system comprising an alarm determination module programmed to perform the steps of:
   (i) setting at least three stability set points including a first set point, a second set point and a third set point;
   (ii) determining a first change between the first set point and the second set point;
   (iii) determining a second change between the second set point and the third set point;
   (iv) determining a change ratio of the second change over the first change; (v) determining a first time taken for a slope to exhibit change between the first set point and the second set point;
   (vi) determining a second time taken for a slope to exhibit change between the second set point and the third set point;
   (vii) determining a time ratio of the second time over the first time; and (viii) setting an alarm if the time ratio is less than the change ratio.

14. The slope monitoring system of claim 13 further comprising a radar that measures the displacement of the slope.

15. The slope monitoring system of claim 13 comprising a processor module that translates raw slope position data to displacement data, velocity data or acceleration data.

* * * * *